Aug. 29, 1944.  A. W. BURGGRAF  2,357,170
ARC WELDING CHILL
Filed Aug. 3, 1940
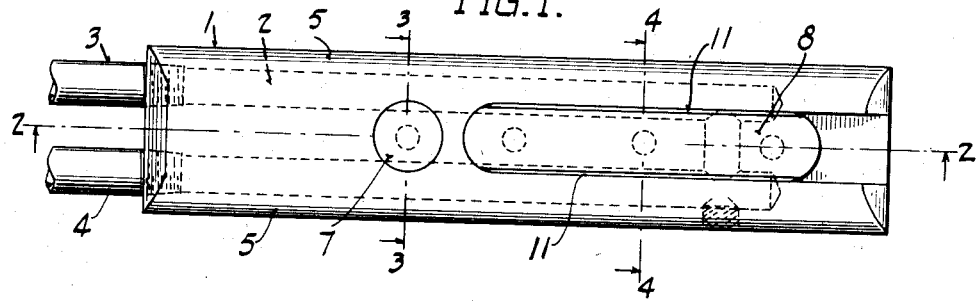
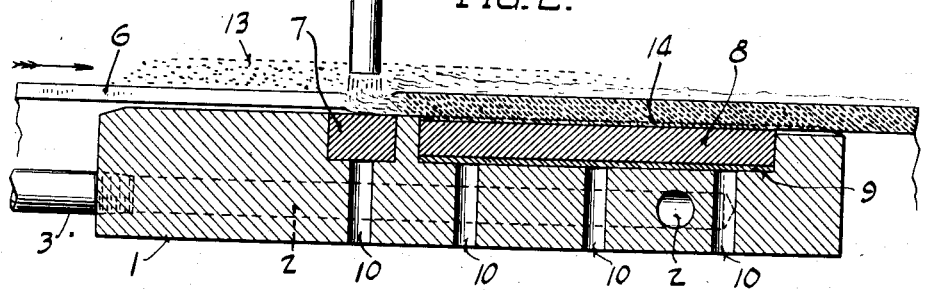
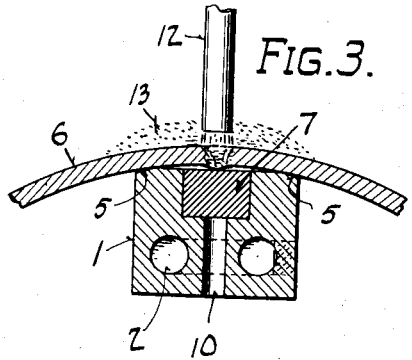
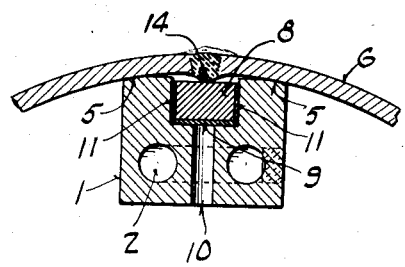
Albert W. Burggraf
INVENTOR.
BY
ATTORNEY.

Patented Aug. 29, 1944

2,357,170

UNITED STATES PATENT OFFICE 2,357,170

ARC WELDING CHILL

Albert W. Burggraf, Milwaukee, Wis., assignor to A. O. Smith Corporation, Milwaukee, Wis., a corporation of New York Application August 3, 1940, Serial No. 350,371

3 Claims. (Cl. 219—17)

This invention relates to a chill for use with the submerged arc method of welding in which the welding arc is produced below a layer of welding flux.

An object of the invention is to provide an improved chill for use in connection with this method of welding.

Another object of the invention is to provide a chill with means for regulating the size of the bead formed beneath the weld.

These and other objects of the invention will be clear from the following detailed description and the accompanying drawing in which:

Figure 1 is a top plan view of a chill constructed in accordance with this invention;

Fig. 2 is a longitudinal section on line 2—2 of Fig. 1 showing the chill in use for the welding of pipe;

Fig. 3 is a section on line 3—3 of Fig. 1; and

Fig. 4 is a section on line 4—4 of Fig. 1.

The chill comprises a metal block 1, preferably of copper because of its high heat conductivity, provided with a passage 2 for the circulation of cooling water from inlet 3 to outlet 4. When used for the welding of pipe the upper side of the chill is desirably curved or beveled along its edges 5 so that the chill may fit closely against the inside of the pipe 6.

The block is provided with a hole for the reception of a copper plug 7 which is fitted tightly into the hole to insure good heat conductivity. A groove is cut longitudinally in the top of the copper block 1 for the reception of an insert 8 which may be supported at any desired height by shims or spacers 9 between it and the bottom of the groove. Holes 10 bored through the block are provided for the insertion of pins to knock out the plug 7 and insert 8 when it is desired to replace them.

Less rapid chilling is desired over the insert 8 than over the plug 7. The insert 8 may be of some metal or alloy with a higher melting point and lower heat conductivity than copper, or it may be of copper. No care is needed to insure good thermal transfer from the insert 8 to the block 1, and in some cases it may even be desirable to interpose heat insulating material 11 between them.

When used in the welding of pipe, the chill is held closely in contact with the inner wall of the pipe 6 by means well known to the art. The pipe 6 is moved longitudinally over the chill between it and weld rod 12 fed towards the work through a layer of powdered flux 13 supplied to the outer surface of the pipe by any suitable means. The chill is so positioned that the arc is formed directly over the plug 7. It is here that the most effective chilling is desired, and it is here, also, that the chill is exposed to the most intense heat. When the plug has been worn by continued exposure to the intense heat, it can be readily knocked out and replaced by another.

Longitudinal motion of the pipe, from left to right in the drawing, brings the newly made weld over the insert 8. It has been found that too rapid chilling away from the region immediately under the arc results in an unsatisfactory weld with a defective weld bead on the inside of the pipe. To decrease the rate of chilling, the insert 8 is set below the top of block 1, so as to provide a space into which the deposited weld metal and the heated edges of pipe 6 can settle to form a smooth weld bead 14.

The size of the bead can be regulated by adjusting the level of the upper surface of insert 8. In many instances satisfactory results can be obtained solely by proper adjustment of the height of a copper insert, but in case it is desired to still further reduce the chilling of the weld, this can be accomplished by making the insert of a poorly conducting metal or alloy, or by interposing heat insulating material 11 between the insert 8 and block 1.

While the use of the chill has been described in connection with the welding of pipe, it is to be understood that it is not limited thereto and can be used in many other applications.

I claim:

1. An arc welding chill comprising a water cooled block of a heat conducting material, a removable plug of heat conducting material set into the block directly beneath the arc in good thermal contact with the block and adapted to be readily removed and replaced when worn by the heat of the arc, and a metallic insert set in the block with its upper surface below the level of the upper surface of the block and extending in the direction of the welded seam trailing the arc.

2. An arc welding chill comprising a water cooled copper block, a removable copper plug set in the block directly beneath the arc in good thermal contact with the block, and adapted to be readily removed and replaced when worn by the heat of the arc, and a metallic insert set in the block with its upper surface below the level of the upper surface of the block and extending in the direction of the welded seam trailing the arc.

3. An arc welding chill comprising a water cooled copper block, a removable copper plug set in the block flush with the top thereof directly beneath the arc in good thermal contact with the block and adapted to be readily removed and replaced when worn by the heat of the arc, a metallic insert set in the block with its upper surface below the level of the upper surface of the block, and thermal insulation interposed between the metallic insert and the copper block.

ALBERT W. BURGGRAF.